(12) United States Patent
Draese et al.

(10) Patent No.: US 10,019,228 B2
(45) Date of Patent: *Jul. 10, 2018

(54) ACCURACY-CONSERVING FLOATING-POINT VALUE AGGREGATION

(71) Applicant: International Business Machines Corporation, Armonk, NY (US)

(72) Inventors: Oliver Draese, San Jose, CA (US); Michael M. Skubowius, Boeblingen (DE); Knut Stolze, Jena (DE)

(73) Assignee: International Business Machines Corporation, Armonk, NY (US)

( * ) Notice: Subject to any disclaimer, the term of this patent is extended or adjusted under 35 U.S.C. 154(b) by 60 days.

This patent is subject to a terminal disclaimer.

(21) Appl. No.: 14/732,814

(22) Filed: Jun. 8, 2015

(65) Prior Publication Data

US 2016/0139882 A1 May 19, 2016

Related U.S. Application Data

(63) Continuation of application No. 14/547,180, filed on Nov. 19, 2014.

(51) Int. Cl.
*G06F 7/483* (2006.01)
*G06F 7/485* (2006.01)
(Continued)

(52) U.S. Cl.
CPC .............. *G06F 7/483* (2013.01); *G06F 7/485* (2013.01); *G06F 7/49905* (2013.01); *G06F 7/5443* (2013.01)

(58) Field of Classification Search
CPC ....................................................... G06F 7/485
See application file for complete search history.

(56) References Cited

U.S. PATENT DOCUMENTS

| 4,866,651 A * | 9/1989 | Bleher ................... G06F 7/485 708/505 |
| 7,212,959 B1 * | 5/2007 | Purcell ................... G06F 7/483 703/13 |

(Continued)

FOREIGN PATENT DOCUMENTS

JP 2012174269 9/2012

OTHER PUBLICATIONS

Demmel et al, "Accurate floating point summation", 2002, pp. 1-37.*

(Continued)

*Primary Examiner* — Chuong D Ngo
(74) *Attorney, Agent, or Firm* — Isaac J. Gooshaw

(57) ABSTRACT

A method for enhancing an accuracy of a sum of a plurality of floating-point numbers. The method receives a floating-point number and generates a plurality of provisional numbers with a value of zero. The method further generates a surjective map from the values of an exponent and a sign of a mantissa to the provisional numbers in the plurality of provisional numbers. The method further maps a value of the exponent and the sign of the mantissa to a first provisional number with the surjective map. The method further generates a test number from the first provisional number and if the test number exceeds a limit, modifies a second provisional number by using at least part of the test number. The method further equates the first provisional number to the test number if the test number does not exceed the limit. The method further sums the plurality of provisional numbers.

10 Claims, 5 Drawing Sheets

(51) Int. Cl.
G06F 7/544 (2006.01)
G06F 7/499 (2006.01)

(56) References Cited

U.S. PATENT DOCUMENTS

| | | | |
|---|---|---|---|
| 7,991,817 B2 * | 8/2011 | DeHon | G06F 7/49942 |
| | | | 708/501 |
| 8,412,760 B2 | 4/2013 | Hickey et al. | |
| 8,825,727 B2 * | 9/2014 | Panda | G06F 7/509 |
| | | | 708/200 |
| 2013/0007077 A1 | 1/2013 | Wegener | |

OTHER PUBLICATIONS

Malcom, Michael, "On Accurate Floating-Point Summation" Copyright © 1971, Association for Computing Machinery, Inc., Communications of the ACM, vol. 14, No. 11, pp. 731-736.
McNamee, John, "A Comparison of Methods for Accurate Summation" ACM SIGSAM Bulletin, vol. 38, No. 1, Mar. 2004, pp. 1-7.
U.S. Appl. No. 14/547,180, entitled "Accuracy-Conserving Floating-Point Value Aggregation", filed Nov. 19, 2014.
IBM Appendix P, list of IBM patents or patent applications treated as related, dated Jun. 5, 2015, pp. 1-2.

* cited by examiner

ACCURACY-CONSERVING FLOATING-POINT VALUE AGGREGATION

BACKGROUND OF THE INVENTION

The present invention relates generally to the field of floating-point number computations and more particularly to the precision of a calculation involving the addition of multiple floating-point numbers.

The value of a number in a computer (a computer number) is expressed in an encoding of one or more adjacent patterns of bits that comprise the computer number, and whose format depends on the type of the number and is defined in the architecture of an instruction set. Fixed point, binary coded decimal, and floating-point are examples of types of numbers defined in instruction sets. A computer interprets the bits of a number and computer instructions manipulate the number according to the number's type and its base. A base assigns a value to a bit that depends on the position of the bit in the number relative to a radix point, an implicit location in the number defined by the architecture or a standard to which the architecture adheres. In a "floating-point" number, the radix point is fixed by the architecture, but can assume various positions in the values that a floating-point number can represent, i.e., the radix point is not fixed, i.e., it can "float", in the various values that a floating-point number can represent.

Floating-point numbers can represent extremely large and small numbers with a fixed number of bits; essentially accomplished by representing the value of a number as a product of two values in separate bit-fields within the number. A base-2 (binary) floating-point number, for example, is expressed with a sign bit (indicating positive or negative), a fraction (sometimes called a mantissa) and an exponent. An implied bit (implicit bit) that is associated with the fraction, that is deduced and not physically present, is often used in binary floating-point numbers to increase the number of bits available to express the fraction or exponent. The fraction becomes a significand when the implied bit associated with the fraction is appended to the fraction. The exponent in a computer number is often not the real-exponent that is used to evaluate the number. A value called a bias is usually added to the real-exponent when the floating-point number is formed. The real-exponent is then the exponent minus the bias.

A floating-point number is evaluated by multiplying the significand by the base raised to the power of the real-exponent (i.e., the base times itself, the real-exponent number of times). Let x be the value of a floating-point number, then $x=\pm 1 \times \text{significand} \times \text{base}^{exponent-bias}$. For example, if the base is 2 and the bias is 128, as in one type of floating-point number in IEEE floating-point format, then $x=\pm 1 \times \text{significand} \times 2^{exponent-128}$. If the base is 16 and the bias is 64, as in one type of floating-point number in a floating-point hexadecimal format, then $x=\pm 1 \times \text{significand} \times 16^{exponent-64}$.

Due to the limited number of bits available in a floating-point number to express the fraction and exponent, an effect called "catastrophic cancellation" can occur when multiple floating-point numbers are added that differ significantly in magnitude. A small value added to a large value can overflow the number of bits available in the fraction of the result and cause some or all of the small value to be lost. When two floating-point numbers are added, the exponent of the number with a smaller exponent is increased to equal that of the larger number, and the fraction in the smaller number is bit-shifted right to compensate for the increased exponent (effectively dividing the number to compensate for the multiplication caused by increasing the exponent). Sometimes the fraction of the smaller number can be bit-shifted to the right far enough to cause bits on the right end of the fraction to be lost. For example, given two floating-point numbers, a and b, where a is much smaller than b, the sequence of additions, b+a−b can incorrectly produce a result that differs from a. While a re-ordered sequence of additions, b−b+a will produce the correct result a, the value of a floating-point variable in a program can be unknown in advance of a calculation, therefore a potential altering of a sequence of floating-point operations to increase the precision of a result is often impractical.

SUMMARY

Aspects of an embodiment of the present invention disclose a method, program product, and system for enhancing an accuracy of a sum of a plurality of floating-point numbers. The method includes receiving a floating-point number and generating a plurality of provisional numbers each with a value of zero. The method further includes generating a surjective map from one or more possible values of an exponent and a sign of a mantissa to one or more provisional numbers in the plurality of provisional numbers. The method further includes mapping a value of the exponent and the sign of the mantissa to a first provisional number with the surjective map. The method further includes generating a test number from the first provisional number and if the test number exceeds a limit, modifying a second provisional number by using at least part of the test number. The method further includes equating the first provisional number to the test number if the test number does not exceed the limit. The method further includes summing the plurality of provisional numbers.

DETAILED DESCRIPTION

Figure 1:
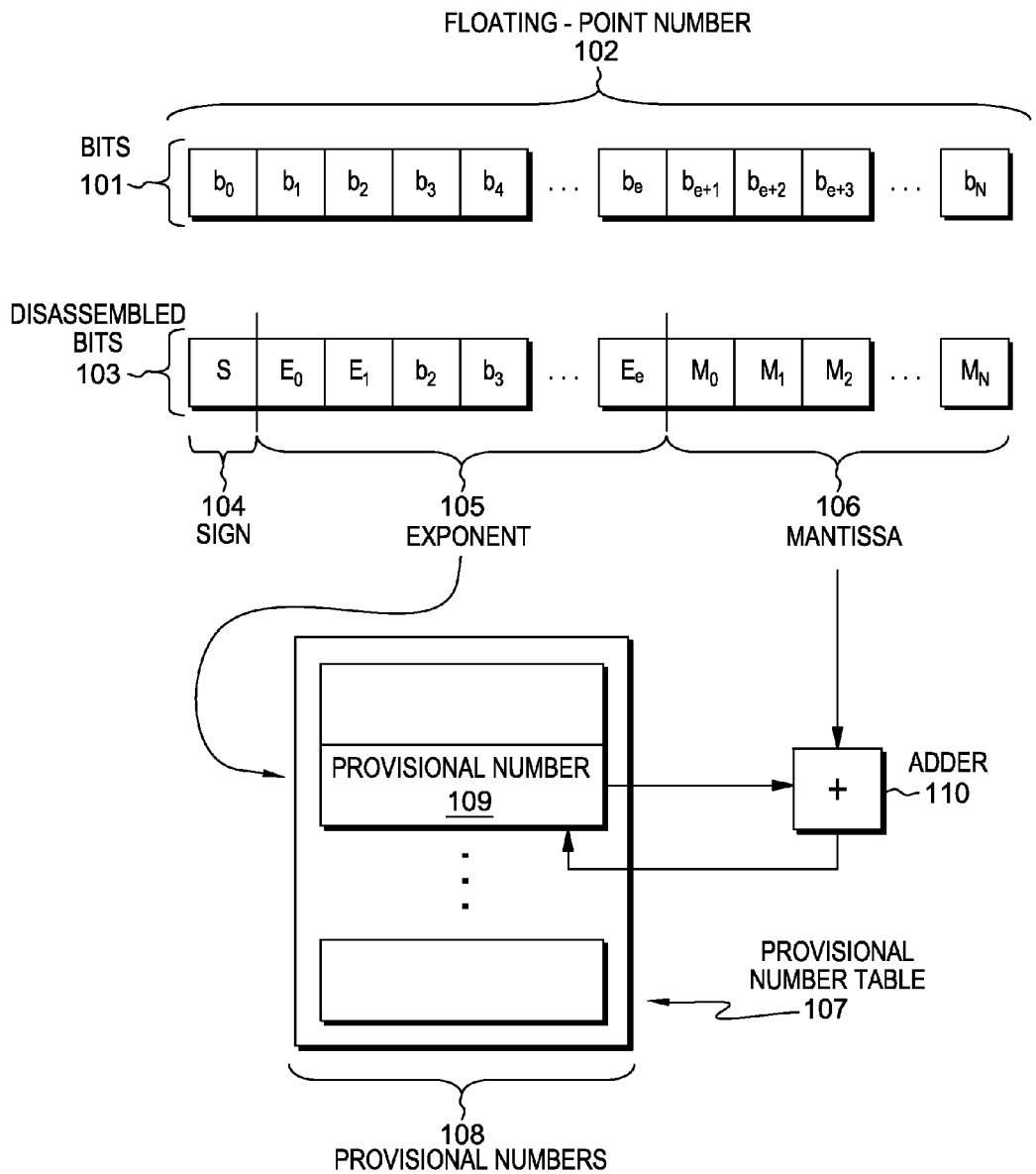
FIG. 1 depicts a block diagram of a floating-point number and a provisional number table, in accordance with an embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Floating-point numbers are useful in a wide variety of applications, but their use is compelling in scientific and engineering applications where precision is necessary and a wide range of numerical magnitudes may be experienced. Floating-point computation often occurs in large complex programs (e.g., weather and climate prediction, computational chemistry, and high-energy physics simulation) that are often executed on supercomputers in an environment in which the speed of a computation often determines an application's utility. Because a complex program may execute for an extended time, sometimes for days or weeks, small accuracy errors in some computations may compound over time into significate errors—errors so large as to render the result of a computation useless or misleading. In some situations, large errors in accuracy can occur immediately, if floating-point numbers that differ significantly in magnitude are added. The term accuracy, used in the context of floating-point numbers, is a measure of how close a result of a floating-point calculation is to the real value. The term precision, used in the context of floating-point numbers, is a measure of how many bits are used to express a result. Therefore, an inaccurate result may be extremely precise. The present invention recognizes the fact that errors in the accuracy of additions of floating-point numbers can be inadvertently introduced into a computation.

Because a floating-point number is expressed in a limited number of bits, a limited number of discrete numbers can be represented. The density of the numbers that can be expressed, i.e., how close the discrete numbers are to each other on the real number line, and how many discrete numbers can be expressed, are related to the precision of the floating-point number. The precision of a floating-point number is directly related to the number of bits in its significand. The magnitude of the most positive and negative numbers that it can express, as well and the smallest number that it can express i.e., a number closest to zero, determine a floating-point number's range.

Several techniques are often used to increase the utility of the limited number of bits available in a floating-point number. For example, to eliminate a need to use a bit to express the sign of the exponent, a "biased" exponent is employed. A fixed implicit value, called a bias, is subtracted from the exponent in a floating-point number to generate the true value of the exponent. For example, if the exponent is 8 and the bias is 128, then the true value of the exponent is (8−128) or −120 and if the exponent is 138, then the true value of the exponent is (138−128) or +10. In this way, positive and negative exponents are represented without using a sign bit, saving a bit-position.

If the exponent is non-zero in a base-2 floating-point number, then the bits in the fractional part are always shifted to the left until a "1" bit (one binary digit) is in the left-most bit position. The exponent is adjusted to compensate for the value of the number being changed by the shift. A shift of the bits in the fraction to the left by one bit (equivalent to multiplying the fraction by 2) requires the value of the binary-based exponent to be decreased by one (equivalent to a division by 2). Since a "1" is always in the left-most position, it is not necessary to express the "1" in the number, and therefore the bit is not physically present—the "1" bit is understood to be present if the exponent is non-zero, and is called the implicit bit or the leading-one bit. This technique increases the number of bits available in the fraction by one, in turn increasing the precision of the number.

The most significant fraction bit (implicit bit) is one in a base-2 floating-point number only if the exponent is non-zero, otherwise the implicit bit is zero. When biased exponents are used and an exponent is zero, the real-exponent is at its largest negative value (because a negative bias is subtracted from the exponent to get the real-exponent, which results in the most negative real-exponent possible, when the bias is subtracted from zero) and therefore the value of the floating-point number is close to zero. Consequently, the value of the number cannot be decreased by adjusting its exponent. A left shift, to move a one into the most significant bit position of a fraction (the implicit bit), moves the radix point to the right, multiplying the value of the fraction by 2 for each left shift. Therefore, a left shift by one bit requires the exponent to become more negative to compensate for the multiplication, but this is not possible as the exponent is already at its most negative value possible.

In modern IT systems, there is often the requirement to aggregate huge amounts of data to summarize the content of a data series. The discrete values of data in the data series are often represented as floating-point numbers (i.e., IEEE-754 float), which use a single bit as a sign indicator, a fixed number of bits to represent the exponent and the rest of available bits to represent the mantissa. The actual decimal value is then represented as $$\text{value} = (-1)^{sign} \cdot \text{mantissa} \cdot b^{exp}$$

where b is often 2 (i.e., IEEE-754 format) or 16 (i.e. in S/360 format). Most representations also imply a leading 1 bit as most significant bit in the mantissa. Therefore, a floating-point number can represent any number between a very large number having a large positive exponent to a very small number having a large negative exponent. The accuracy with which a calculation can be carried out depends on the exponents of the numbers involved, i.e. if a small number with a small or negative exponent is added to a large number with a large exponent, then accuracy may be lost, due to the limited amount of bits in the mantissa.

A limited number of bits in a mantissa to accommodate a right-shift can lead to a loss of accuracy when a large exponent number is added to a small exponent number. The following is an example of this loss of accuracy, shown by a snippet of C code which adds a small exponent number (a) to a large exponent number (b).

double a=1.00005;
double b=1000000000000.0;
PRINT b+a−b;
>1.0000000000000000

Normalized, a is stored as 1.0005*10^0 and b as 1.0*10^12 (for simplicity a decimal representation is used here, although the actual representation within a binary computer uses a binary representation, i.e. instead of using 10 as a base, 2 is used as the base). When adding b and a, the exponent of a is adjusted to the higher exponent 10^12, therefore a is transformed to 0.00000000000100005. The decimal point is shifted to the left 12 places, in effect dividing the number by 10^12, to compensate for the multiplication by 10^12 (by increasing the exponent). If the mantissa does not have enough bits to store the right shifted value, then some accuracy is lost. In above example, the mantissa can store the 0.000000000001 but not the 0.00000000000000005. Therefore, 1.0*10^12 is incorrectly added to 0.000000000001*10^12. When b is subtracted, accuracy of the computation is lost—instead of the correct value of 1.00005, the result is 1.0. Therefore, a single high exponent number in a series of floating-point additions can cause undesired loss of accuracy even if the high exponent number would have been subsequently cancelled out by an equally high exponent negative number in the series of floating-point additions.

In an embodiment, an accuracy of a series of floating-point additions is enhanced by creating an opportunity for some of the numbers to cancel each other out regardless of whether the numbers are near to each other in the series of floating-point additions or not, decreasing the plurality of accuracy-decreasing right-shifts. Two floating-point numbers cancel each other out to an extent if they are added and both have the same exponent but the mantissa in each has a different sign, i.e., one mantissa is positive and one mantissa is negative. In an embodiment, a plurality of provisional numbers is created, one provisional number for each value that an exponent in a floating-point number can assume. Each value of an exponent is mapped to one and only one provisional number (which yields a surjective map). As each floating-point number in a series of floating-point numbers to be added is processed, the mantissa of a floating-point number is added to that provisional number that is mapped to the exponent of the floating-point number if the mantissa is positive. The mantissa of a floating-point number is subtracted from a provisional number that is mapped to the exponent of the floating-point number if the mantissa is negative and the provisional number is positive. Since a mantissa is only added to one or more other mantissa's that have the same exponent, and because the mantissas are mapped to the same provisional number, there is no need to right-shift a mantissa, and potentially lose accuracy by losing bits at the right end of the right-shift operation.

The value of a given provisional number may increase as a consequence of additions to it to a point where the provisional number is close to an overflow. In an embodiment, a provisional number is close to an overflow if a largest possible mantissa can be added to the provisional number and cause the provisional number to overflow. To prevent such an overflow, the provisional number that is close to an overflow, called the overflow provisional number, is added to a different provisional number with a larger exponent. In an embodiment, the overflow provisional number is set to zero after it has been added to the provisional number with a larger exponent.

In an embodiment, a part of the overflow provisional number is added to the provisional number with a larger exponent, and that part of the overflow number, that is added to the provisional number with a larger exponent, is set to zero in the overflow provisional number. In an embodiment, a check for a possible overflow in a provisional number is performed after a mantissa is added to it, and at least part of the provisional number is added to a provisional number with a larger exponent if the provisional number is close to an overflow. In an embodiment, a check for a possible overflow in a provisional number is performed before a mantissa is added to it, by generating a test number that is the sum of the provisional number and the mantissa, and at least part of the provisional number is added to a provisional number with a larger exponent if the test number overflows. In an embodiment, the part of the overflow provisional number that is added to the provisional number with a larger exponent is bit-shifted before the addition to compensate for the change in the exponent, i.e., to compensate for being associated with the larger exponent rather than the exponent that the overflow provisional number had been associated with.

In an embodiment, to enhance opportunities for cancellation, the overflow provisional number is added to a provisional number that is mapped to the nearest larger exponent to that of the overflow provisional number and has an opposite sign to that of the overflow provisional number. In some scenarios and embodiments, adding positive and negative numbers having the same exponent to the same provisional number tends to prevent the absolute value of the provisional from getting larger, thereby inhibiting an overflow. After processing all floating-point numbers to be summed, the provisional numbers are summed to produce a result.

FIG. 1 depicts bits 101 that comprise floating-point number 102. Bits 101 consists of n+1 bits that represent a sign of a mantissa, a mantissa, and an exponent. Bits 101 are partitioned into sign bit 104, exponent 105, and mantissa 106 in disassembled bits 103. In an embodiment, exponent 105 is mapped to provisional number 109 in provisional number table 107, which is used to access provisional number 109. Provisional number 109 is a provisional number in provisional numbers 108. Mantissa 106 of floating-point number 102 is added to provisional number 109 using adder 110, if the addition will not cause provisional number 109 to overflow, and after the addition, then provisional number 109 is written back to provisional number table 107. In an embodiment, a test number is generated by adding mantissa 106 to provisional number 109 to determine if provisional number 109 will overflow. If the test number overflows, then the addition will cause provisional number 109 to overflow. If the addition will cause provisional number 109 to overflow, then a second provisional number that will not overflow is selected from provisional number table 107 and mantissa 106 is added to the second provisional number.

In an embodiment, a plurality of provisional numbers is created, one provisional number for each combination of a value of an exponent and a sign of a mantissa. That is, for each value of an exponent, two provisional numbers are created, one provisional number for a positive value of a mantissa and one provisional number for a negative value of a mantissa. The exponent and the sign of the mantissa of a floating-point number to be included in a summation process is mapped to a provisional number that has been created for that exponent and that sign of the mantissa. The absolute value of the mantissa is added to the provisional number for a positive mantissa if, a) the mantissa is positive and, b) if the provisional number will not overflow as a result. The absolute value of the mantissa is added to the provisional number for a negative mantissa if, a) the mantissa is negative and, b) if the provisional number will not overflow as a result.

In an embodiment, a test number is generated by adding the absolute value of the mantissa to the provisional number to determine if the provisional number will overflow. If the test number overflows, then the provisional number will overflow. If the provisional number will overflow, then the absolute value of the mantissa is added to an alternative provisional number. In an embodiment, because provisional number 215 would have overflowed had mantissa 106 been added to it, a part of provisional number 215 is added to the second provisional number. In an embodiment, that part of provisional number 215 that is added to the second provisional number is zeroed.

The present invention recognizes that a technique that only uses additions does not have to incorporate a logic to perform subtractions. In other words, a technique that adds an absolute value of a mantissa to one of two provisional numbers mapped to the exponent, one provisional number for a positive mantissa and one provisional number for a negative mantissa, makes a logic to perform a subtraction unnecessary, and simplifies the logic.

Figure 2:
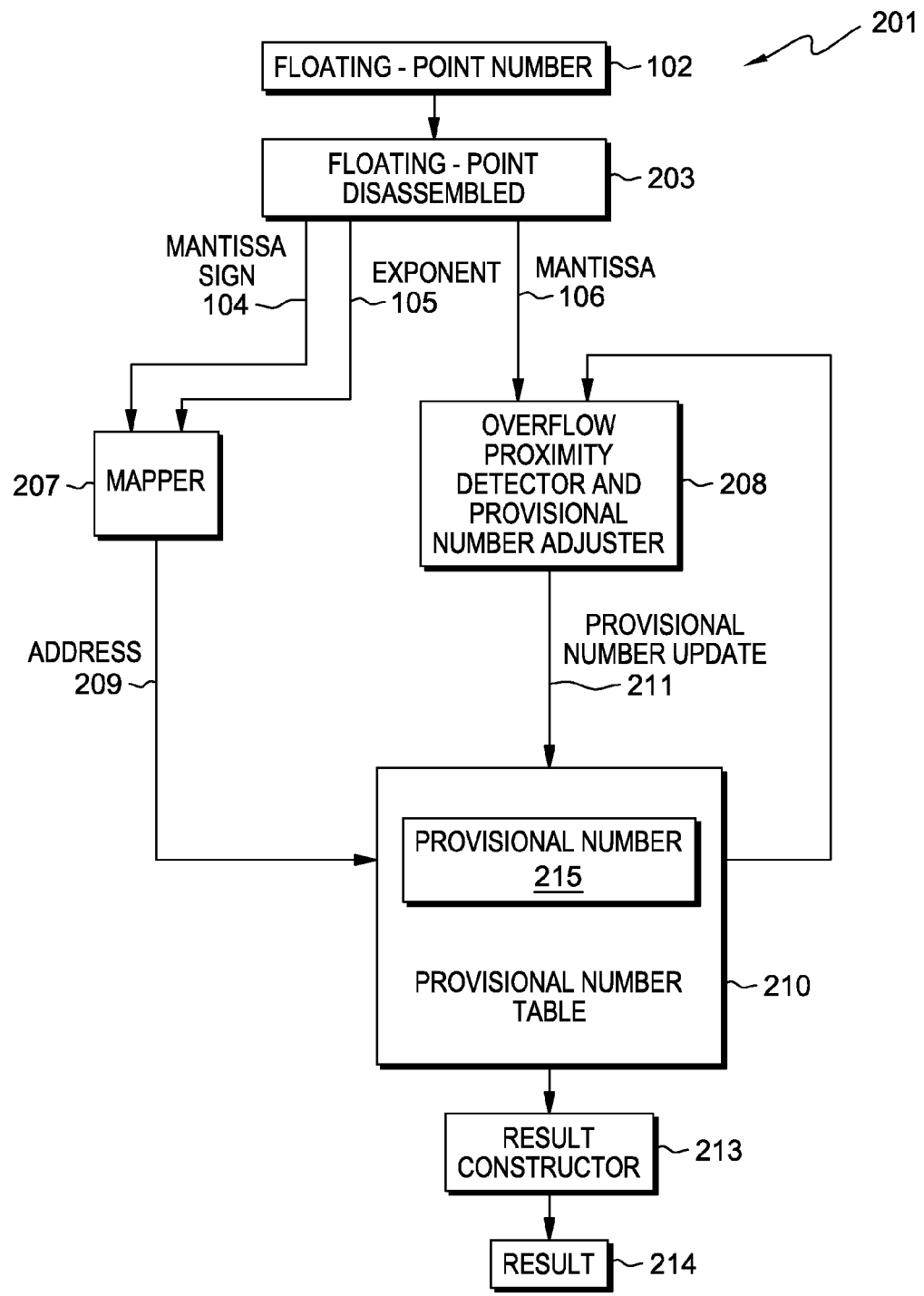
FIG. 2 depicts a block diagram of a floating-point number aggregation system, in accordance with an embodiment of the present invention.

FIG. 2 depicts floating-point aggregation system 201. In an embodiment, floating-point number 102 is disassembled into mantissa sign 204, exponent 105, and mantissa 106 in floating-point disassembler 203. Address 209, an address into provisional number table 210, is generated from mantissa sign 104 and exponent 105 in mapper 207. Address 209 is an address of provisional number 215 in provisional number table 210. Provisional number 215 is routed to overflow proximity detector and provisional number adjuster 208. Mantissa 106 of floating-point number 102 is also routed to overflow proximity detector and provisional number adjuster 208.

In an embodiment, overflow proximity detector and provisional number adjuster 208 determines whether mantissa 106 can be added to provisional number 215 without incurring an overflow. In an embodiment, a test number is generated that is the sum of mantissa 106 and provisional number 215 to determine whether the test number overflows. If the test number overflows, then provisional number 215 will overflow if added to mantissa 106. If an overflow will not occur, then mantissa 106 is added to provisional number 215. If an overflow will occur, then a second provisional number with a larger exponent that will not overflow is selected from provisional number table 210 and mantissa 106 is added to the second provisional number. Before the addition, mantissa 106 is bit-shifted to compensate for the larger exponent of the second provisional number. In an embodiment, because provisional number 215 would have overflowed had mantissa 106 been added to it, a part of provisional number 215 is added to the second provisional number with a larger exponent. Before the addition, the part of provisional number 215 to be added to the second provisional number is bit-shifted to compensate for the larger exponent of the second provisional number. In an embodiment, that part of provisional number 215 that is added to the second provisional number is zeroed in provisional number 215. To zero a number is to replace the one or more digits in it with a zero.

In an embodiment, overflow proximity detector and provisional number adjuster 208 adds mantissa 106 to provisional number 215 and then determines if provisional number 215 can overflow if a largest mantissa possible is added to it without incurring an overflow. If an overflow will not occur in the event that a largest mantissa possible is added to provisional number 215, then provisional number 215, now augmented with mantissa 106, is written back to provisional table 210. If an overflow will occur in the event that a largest mantissa possible is added to provisional number 215, then a second provisional number with a larger exponent than that associated with provisional number 215, that will not overflow, is selected from provisional number table 210 and some or all of provisional number 215, now augmented with mantissa 106 is added to the second provisional number. Before the addition, that part of provisional number 215 that is to be added to the second provisional number, is bit shifted to compensate for the larger exponent associated with the second provisional number. In an embodiment, the part of provisional number 215 that is added to the second provisional number is zeroed in provisional number 215.

After all floating-point numbers to be summed are processed by floating-point aggregation system 201, result constructor 213 accesses all the provisional numbers in provisional number table 210, adds them together, and produces result 214.

In an embodiment, to create the sum, result constructor 214 sums the provisional numbers in provisional number table 210 in order of exponent size. The provisional number with the largest associated exponent is the first number. Then a second provisional number with the second largest exponent is added to the first number, after a bit-shift of the second provisional number to compensate for the difference in the exponents between the first number and the second number. This process of adding the provisional numbers (after bit-shifting to compensate for a difference in exponents) continues until a bit-shift of a provisional number to be added to the sum effectively eliminates the entire provisional number to be added. The summing process terminates at this point as there is it is impossible to add provisional numbers with smaller exponents to the sum.

Figure 3:
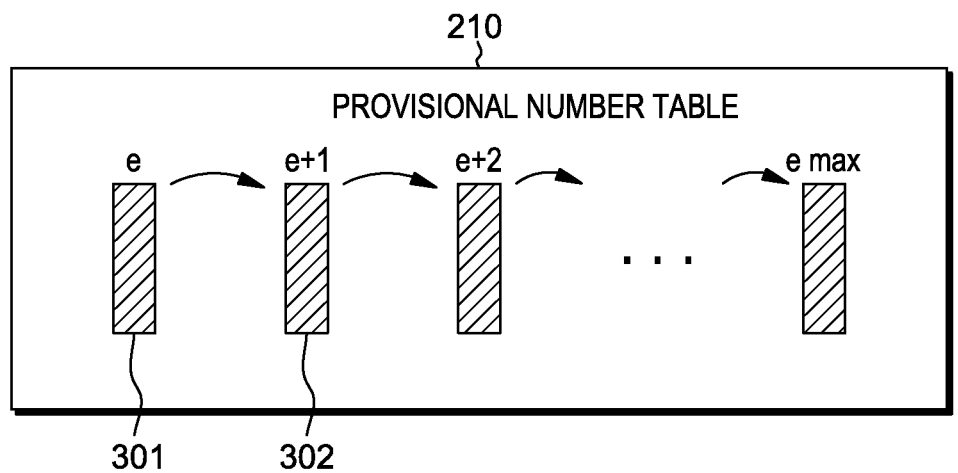
FIG. 3 depicts a block diagram of the provisional number table shown in FIG. 2, in accordance with an embodiment of the present invention.

FIG. 3 depicts an embodiment of provisional number table 210, in which an exponent in a floating-point number is mapped to one provisional number regardless of the sign of the mantissa in the floating-point number. If the sign of the mantissa is positive, then the mantissa is added to the one provisional number. If the sign of the mantissa is negative, then the mantissa is subtracted from the one provisional number. For example, exponent 105 is mapped to provisional number 301 if the value of exponent 105 is e. If provisional number 301 is close to overflowing after adding mantissa 106 to provisional number 301, then provisional number 301 is added to provisional number 302 (the provisional number with the next larger exponent). However, before provisional number 301 is added to provisional number 302, provisional number 301 is bit shifted to compensate for the larger exponent associated with provisional number 302. In this embodiment, a provisional number may be positive or negative and therefore an addition or a subtraction may be required.

Figure 4:
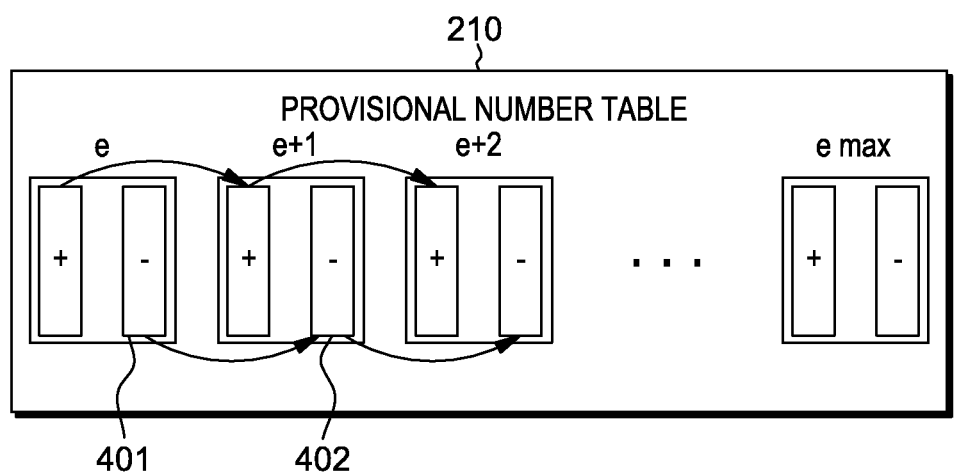
FIG. 4 depicts a block diagram of the provisional number table shown in FIG. 2, in accordance with an embodiment of the present invention.

FIG. 4 depicts an embodiment of provisional number table 210, in which the exponent and the sign of the mantissa are mapped to a provisional number. For a given exponent, two provisional numbers are used, specifically a provisional number for a positive mantissa and a provisional number for a negative mantissa. For example, if the value of exponent 105 is e and if mantissa 104 is negative, then exponent 105 and mantissa sign 104 is mapped to provisional number 401. If, after adding mantissa 106 to provisional number 401, provisional number 401 is close to overflowing, then provisional number 401 is added to provisional number 402, which is the provisional number with the next larger exponent that is mapped to a negative mantissa. Therefore, only an addition is necessary when a provisional number (that is close to overflow) must be added to another provisional number with a larger exponent. A subtraction is not necessary because only positive values are being added.

In an embodiment, the addition of a first provisional number with a smaller exponent to a second provisional number with a larger exponent can cause the second provisional number to overflow. In such a scenario, when the second provisional number is added to a third provisional number, the third provisional number may also overflow. That is, an overflow can cause a cascade of other overflows, and each overflow is handled in the same manner.

Figure 5:
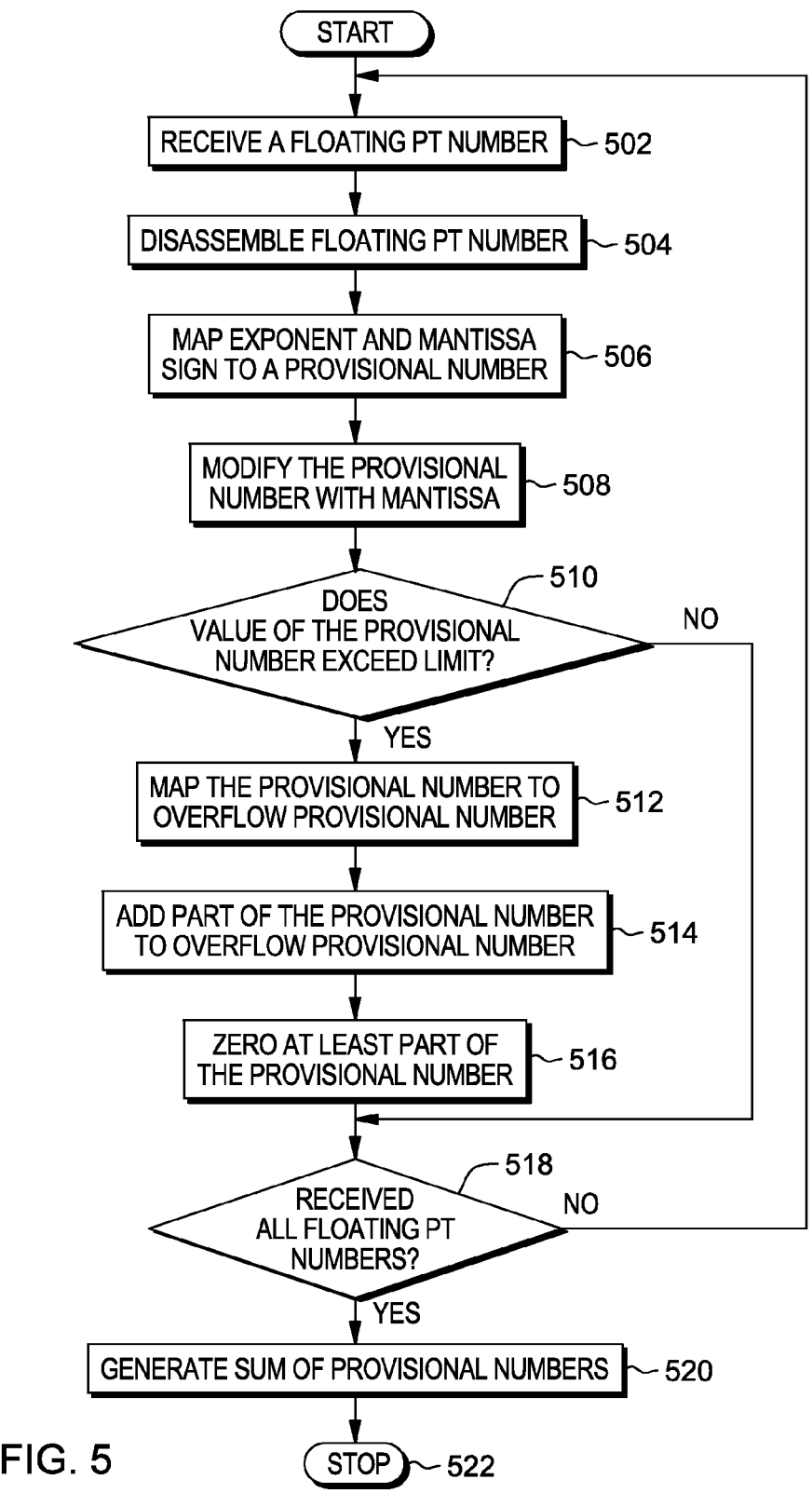
FIG. 5 depicts a flow chart of the operational steps performed by the floating-point aggregation system shown in FIG. 2, in accordance with an embodiment of the present invention.

FIG. 5 depicts the operational steps performed by floating-point aggregation system 201, in an embodiment and scenario. Floating-point aggregation system 201 receives floating-point number 102 (step 502). Floating-point number 102 is disassembled into mantissa 106, mantissa sign 104 and exponent 105 (step 504). Exponent 105 and mantissa sign 104 are mapped to provisional number 215 (step 506). Provisional number 215 is modified with mantissa 106 (step 508). In an embodiment, mantissa 106 is added to provisional number 215. The value of provisional number 215 is compared to a limit in decision step 510. In an embodiment, the limit is equal to the largest value that provisional number 215 can contain, minus the value of the largest possible mantissa that floating-point number 102 can contain.

In decision step 510, if the value of provisional number 215 has not exceeded the limit (decision step 510, NO branch), then a determination is made as to whether all floating-point numbers to be summed have been received by floating-point aggregation system 201, in decision step 518. If all floating-point numbers have been received (decision step 518, YES branch), then a sum of all the provisional numbers in provisional number table 210 is generated by result constructor 213, i.e., result 214 is generated in step 520. Then the process terminates (step 522). If in decision step 518, it is determined that all floating-point numbers to be summed have not been received (decision step 518, NO branch), then another floating-point number is received (step 502). If in decision step 510, it is determined that the value of provisional number 215 exceeds the limit (decision step 510, YES branch), then provisional number 215 is mapped to an overflow provisional number that is mapped to an exponent that is larger than exponent 105 (step 512). In an embodiment, provisional number 215 is mapped to an overflow provisional number that is mapped to the next larger exponent relative to exponent 105.

In an embodiment, part of provisional number 215 is added to the overflow provisional number (step 514). In an embodiment, an entirety of provisional number 215 is added to the overflow number in step 514. At least part of provisional number 215 is zeroed (step 516). In an embodiment, that part of provisional number 215 that is added to the overflow number is zeroed in provisional number 215 in step 516. The process then proceeds to decision step 518.

In one embodiment, the processes described in the discussion of FIGS. 1-6 are embodied as a combination of electronic circuits (for example, combinations of semiconductor structures such as transistors, resistors, capacitors and the like that are organized into an electronic circuit that is configured to execute one or more of the processes described in the discussion of FIGS. 1-6) included in one or more integrated circuit chips. As such, the one or more integrated circuit chips are configured to execute at least a part of the processes described in the discussion of FIGS. 1-6. Such integrated circuit chips may be incorporated as part of a computing system that is configured to execute at least a part of the processes described in the discussion of FIGS. 1-6.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Figure 6:
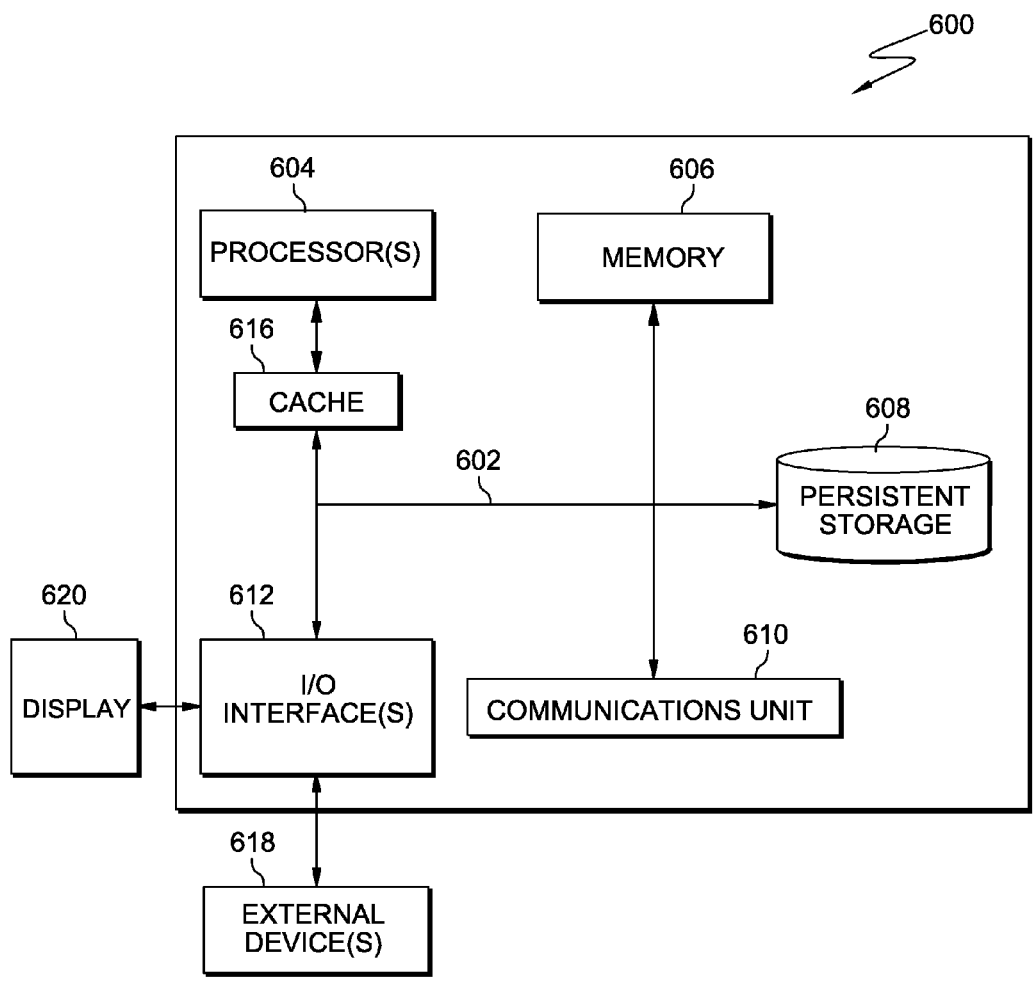
FIG. 6 depicts a block diagram of a computer system that incorporates the floating-point aggregation system that is depicted FIGS. 2, 3, 4 and 5, in accordance with an embodiment of the present invention.

FIG. 6 depicts computer system 600 that is an example of a system that includes floating-point aggregation system 201. Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory. In general, memory 606 can include any suitable volatile or non-volatile computer readable storage media. Cache 616 is a fast memory that enhances the performance of processors 604 by holding recently accessed data and data near accessed data from memory 606.

Program instructions and data used to practice embodiments of the present invention may be stored in persistent storage 608 for execution by one or more of the respective processors 604 via cache 616 and one or more memories of memory 606. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 603 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

Each respective figure, in addition to illustrating methods of and functionality of the present invention at various stages, also illustrates the logic of the method as implemented, in whole or in part, by one or more devices and structures. Such devices and structures are configured to (i.e., include one or more components, such as resistors, capacitors, transistors and the like that are connected to enable the performing of a process) implement the method of merging one or more non-transactional stores and one or more thread-specific transactional stores into one or more cache line templates in a store buffer in a store cache. In other words, one or more computer hardware devices can be created that are configured to implement the method and processes described herein with reference to the Figures and their corresponding descriptions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein.

Embodiments of the present invention may be used in a variety of electronic applications, including but not limited to advanced sensors, memory/data storage, semiconductors, microprocessors and other applications.

A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may be included by only some of the described embodiments. Accordingly, the invention is not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later come to be known to those of ordinary skill in the art are expressly incorporated herein by reference and intended to be encompassed by the invention. It is therefore to be understood that changes may be made in the particular embodiments disclosed which are within the scope of the present invention as outlined by the appended claims.

What is claimed is:

1. A method for generating data structures for computer memory and storing generated data therein, the method comprising:

receiving, by one or more processors, a plurality of floating point numbers, the plurality of floating point numbers including a floating-point number that has (i) a first significand and (ii) a first exponent included in a range of exponents;

generating, by the one or more processors, a plurality of provisional data structures that each have (i) a second significand with an initial value of zero and (ii) a second exponent that is included in the range of exponents, wherein the plurality of provisional data structures are stored in a first computer memory, wherein the plurality of provisional data structures are stored in a first computer memory;

generating, by the one or more processors, a surjective map using (i) the second exponent and a sign of the second significand of a first provisional data structure of the plurality of provisional data structures and (ii) the first significand and the first exponent of the floating-point number, wherein the surjective map is stored in a second computer memory, wherein the surjective map is stored in a second computer memory;

mapping, by the one or more processors, a value of the first exponent and a sign of the significand of the floating-point number to the first provisional data structure included in the surjective map;

generating, by the one or more processors, a test data structure from the first provisional data structure by modifying the second significand of the first provisional data structure using the first significand such that the second significand has a non-zero value, wherein the test data structure is stored in a third computer memory;

deriving a value based on a content of the test data structure;

executing one of (i) responsive to the value derived from the test data structure exceeding a first threshold, modifying, by the one or more processors, a second provisional data structure to incorporate, at least in part, the content of the test data structure, wherein an exponent of the second provisional data structure is greater than an exponent of the first provisional data structure, or (ii) responsive to the value derived from the test not exceeding being less than or equal to the first threshold, modifying, by the one or more processors, the first provisional data structure such that a content of the first provisional data structure is equal to the content of the test data structure; and;

generating, by the one or more processors, a new data structure that represents respective contents of the plurality of provisional data structures, wherein the plurality of provisional-data structures includes at least one provisional data structure that was modified to include the respective significands of at least two floating-point numbers included in the plurality of floating point numbers, wherein the new data structure represents a value that is expressible by a limited number of memory bits.

2. The method of claim 1, further comprising:
responsive to the test data structure exceeding a second threshold by zeroing, by the one or more processors, one or more bits in the modified first provisional data structure.

3. The method of claim 1, further comprising:
generating, by the one or more processors, a modified first provisional data structure by modifying the first provisional data structure using the first significand and a sign of the first significand.

4. The method of claim 1, wherein a given provisional data structure is respectively mapped, one-to-one, to a value included in the surjective map that corresponds to a value of the second exponent of the given provisional data structure.

5. The method of claim 1, wherein either (i) the significand is positive and the plurality of provisional data structures includes a first set of provisional data structures that includes a provisional data structure for each value of the exponent that are used or (ii) the significand is negative and the plurality of provisional data structures includes a second set of provisional data structures that includes a provisional data structure for each value of the exponent that are used.

6. The method of claim 5, wherein each provisional data structure in the plurality of provisional data structures is mapped one-to-one to a value comprising an exponent and a polarity of the first significand.

7. The method of claim 6, wherein either (i) the significand is positive and the first provisional data structure is included in the first set of provisional data structures or (ii) the significand is negative and the first provisional data structure is included in the second set of provisional data structures.

8. The method of claim 1, wherein the test data structure is generated by modifying a value of the second significand of the first provisional data structure to meet or exceed a value of the first significand of the floating-point number.

9. The method of claim 1, wherein a given provisional data structure includes an integer that is (i) raised to the first exponent and (ii) is multiplied with the second significand.

10. The method of claim 1, wherein the plurality of provisional data structures are generated based on combinations of (i) values included in the range of exponents and (ii) possible positive or negative sign of the first significand.

* * * * *